Clair R. Crisp, INVENTOR.

BY

ATTORNEY

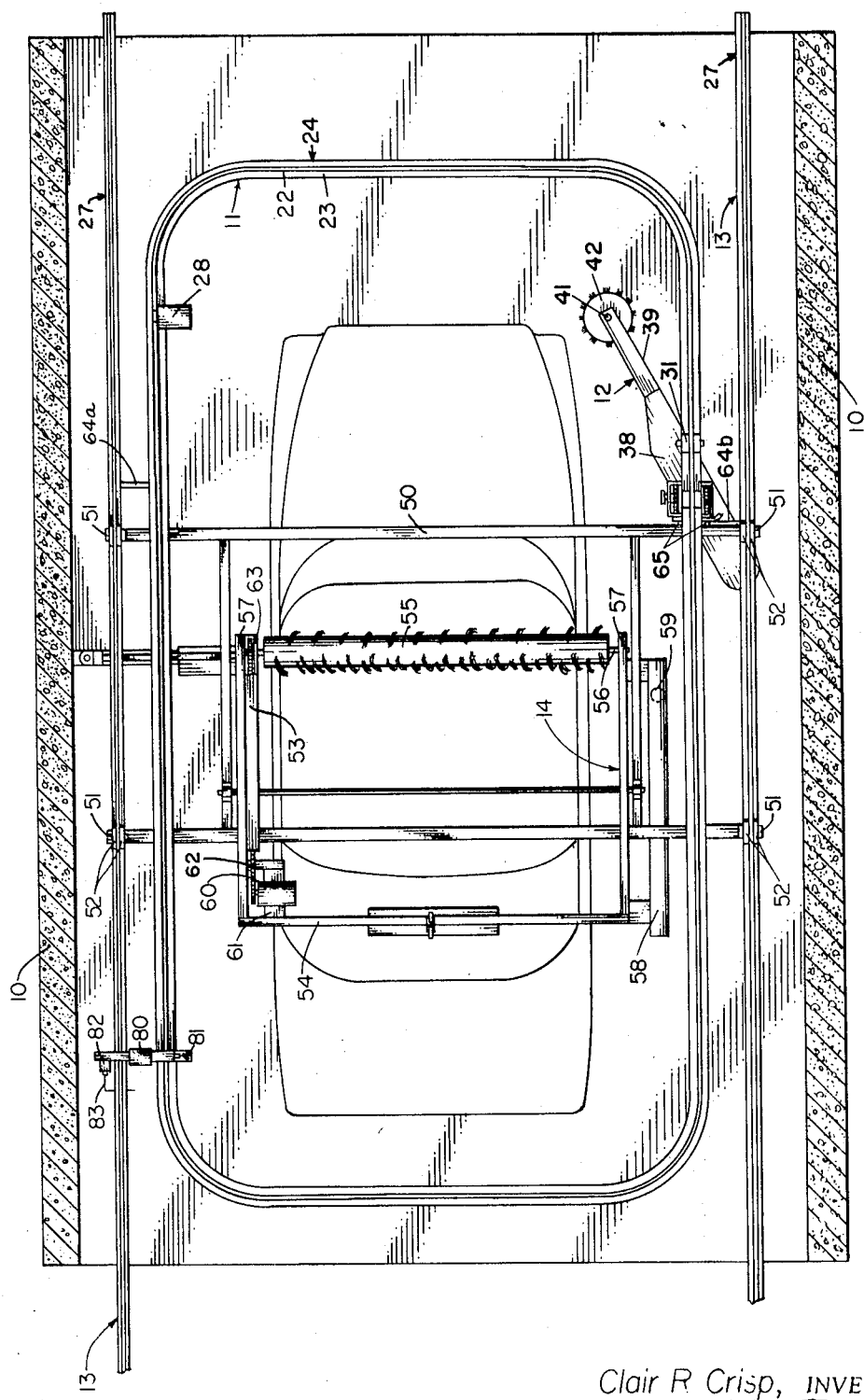

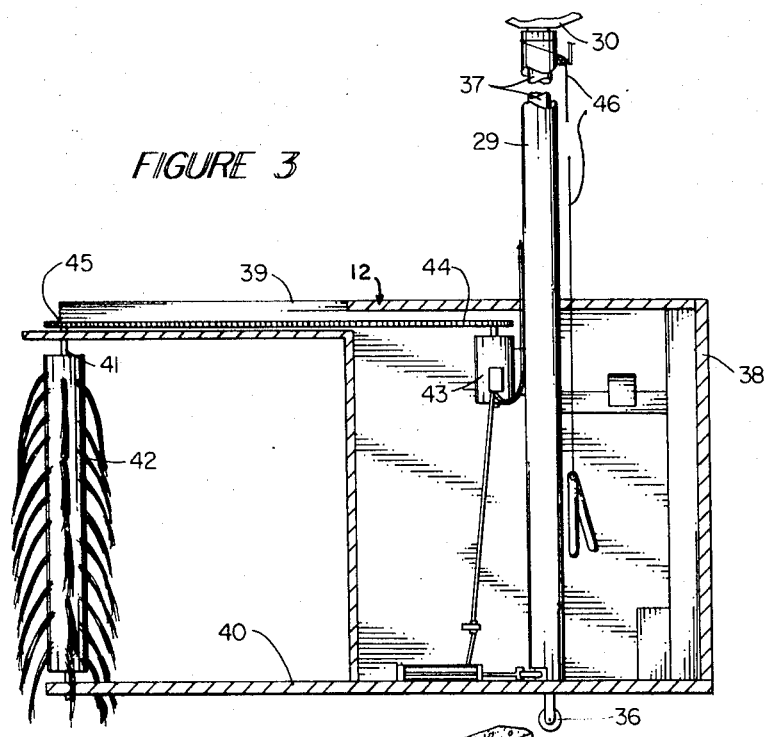
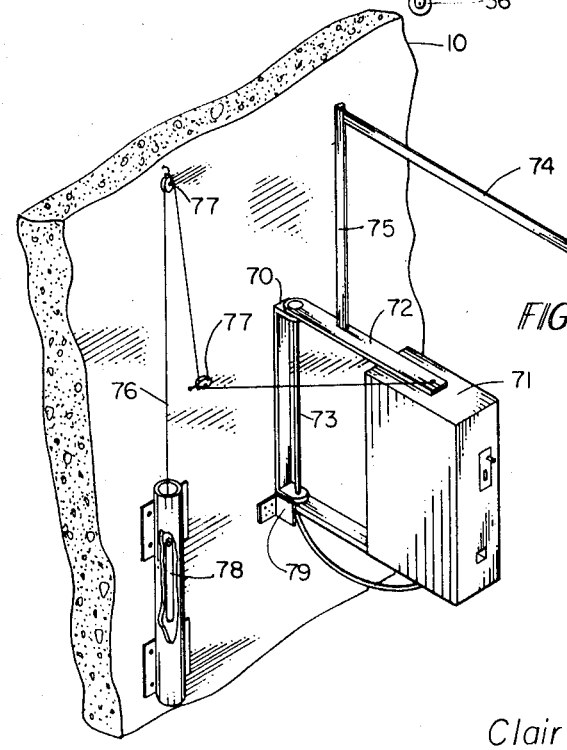

May 25, 1971  C. R. CRISP, JR  3,579,701
AUTOMATIC CAR WASHER
Filed June 3, 1968  4 Sheets-Sheet 4
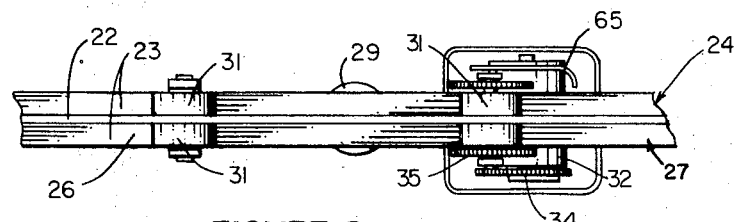
FIGURE 6
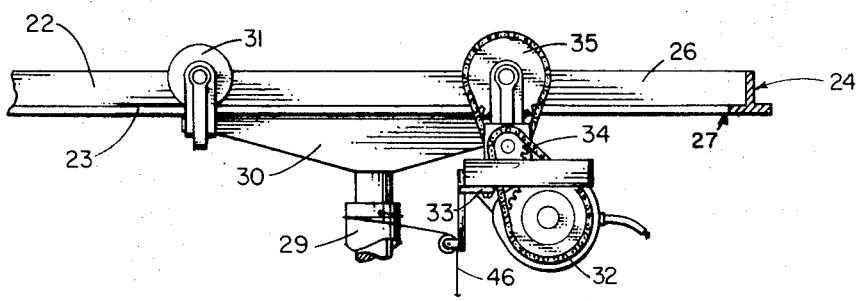
FIGURE 5
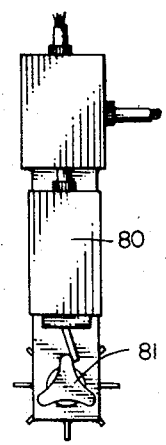
FIGURE 7
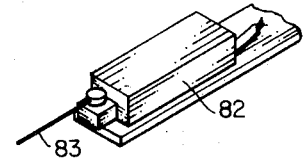
FIGURE 8
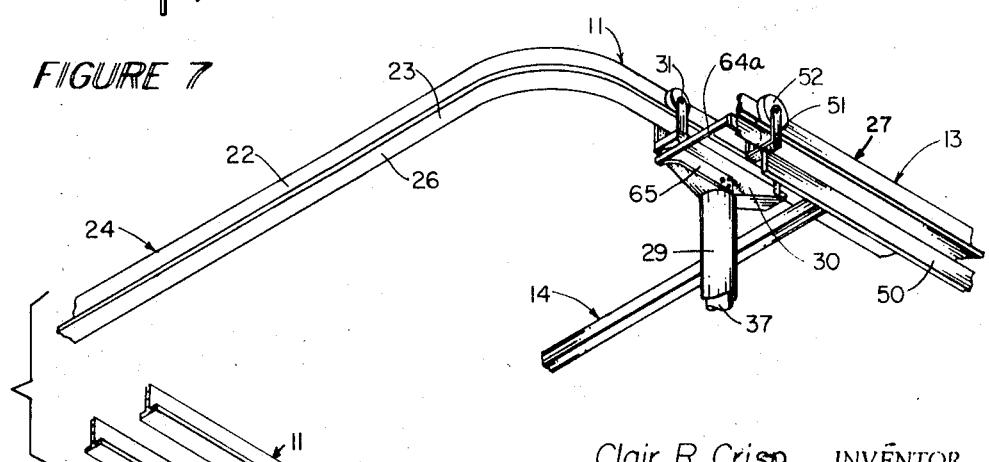
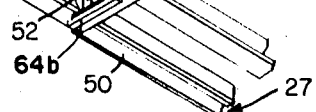
FIGURE 9
Clair R. Crisp, INVENTOR.
BY
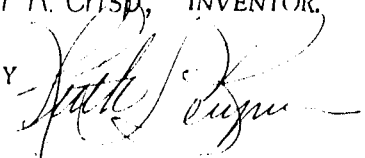
ATTORNEY

United States Patent Office 3,579,701
Patented May 25, 1971

3,579,701
AUTOMATIC CAR WASHER
Clair R. Crisp, Jr., 3308 E. 30th Ave.,
Spokane, Wash. 99203
Filed June 3, 1968, Ser. No. 734,083
Int. Cl. B60s *3/06;* A46b *13/02*
U.S. Cl. 15—21                    5 Claims

ABSTRACT OF THE DISCLOSURE

Washing mechanism for a stationary automobile providing a first brush rotatable about a vertical axis transiting about the car and a second brush rotating about a horizontal axis transiting across the top with mechanical linkage therebetween causing the vertical brush to move the horizontal brush. The invention provides auxiliary systems for application of washing and auxiliary solutions. The device is economic in construction and adapted particularly for attendantless coin activated operation.

BACKGROUND OF INVENTION

Field of invention

This invention relates generally to the field of mechanical car washing devices and more particularly to such a device employing appropriate mechanical linkage to cause a vertically journaled brush in its transit about a car to appropriately move a horizontally journaled top brush reciprocally across the top of the vehicle.

Description of prior art

The mechanical washing of automobiles has heretofore become a well developed art. Broadly the known art may be divided into a first class encompassing devices wherein the vehicle to be operated upon is physically moved through a particular course during which the washing operations are accomplished, and into a second class wherein the vehicle remains stationary and the washing is carried out in some fashion by mechanical adaptations in the washing structure. The first class of devices have heretofore been well developed and many such mechanisms are known. They do, however, generally require complex mechanical structures of reasonably great size, or at least of a size much greater than the structures required in the second class. Because of the operation of such first class devices, they also are not well adaptable to automatic or coin type operation, but generally require operators for proper functioning.

It is with the second class of devices that the instant invention is concerned. In this class it has heretofore become known to provide a car washer with a side brush journaled upon a substantially vertical axis transiting about a vehicle and a top brush journaled about a substantially horizontal axis transiting across the top of the vehicle. Heretofore, however, the transiting of the top and side brushes has either been accomplished independently or if at the same time by complex mechanical or electrical-mechanical communications which have provided a machine of a delicate nature quite readily susceptible to breakdown and one of high cost. Such known devices do however have the obvious advantages of requiring smaller space than those of the first class, but because of their mechanical disadvantages they usually have required an attendant.

The instant invention seeks to alleviate these problems by providing such a device with a simple direct mechanical linkage between the horizontal and vertical brushes to allow the vertical brush, in its course of transit about the side periphery of a vehicle, to cause the simultaneous non-interfering transfer of the top brush reciprocally across the top of the vehicle to wash that portion of the car. This structure allows a compact machine of substantially lower cost than those heretofore known and one of such mechanical reliability that it may readily be operated on an automatic coin activated basis without the necessity of an attendant. Simple auxiliary structure, as heretofore known, may be added to allow application of wax to a washed vehicle, to separately and more vigorously wash the wheels, and to dry the washed vehicle.

SUMMARY OF INVENTION

The instant invention was conceived to provide a car washing device of such mechanical reliability and small size that it might be economically adapted to coin activated, attendantless operation, by providing a simple mechanical linkage between a vertically journaled side brush transiting about the periphery of a vehicle and a horizontally journaled top brush transiting reciprocally across the top of the vehicle.

To accomplish this function a housing structure is provided with peripheral surfaces of such nature as to accept a vehicle to be washed within its central chamber and support the various washing apparatus in operative fashion about the interior of its peripheral walls. Continuous side brush tracks are provided on the floor of the chamber and near the ceiling, or at least above the upper extension of a vehicle to be washed, the track being somewhat larger than the vertical extensions of the external periphery of a vehicle. A carriage, provided for transit about this track, rotatbly mounts, on biased, inwardly extending arms, a washing brush. The brush is powered for rotation and the carriage is powered for motion about its carrying track. This brush is adapted to wash the substantially vertical peripheral surfaces of a vehicle.

A second elongate track system is provided above the upper side brush track; this second track supports a carriage for the top brush, this carriage being movable in either direction along its track. The top brush is journaled in arms pivotably mounted on the carriage for motion upward and downward, but again biased to a downward position to allow its brush to come into contact with the top of a vehicle. The top brush similarly is powered for rotation.

Mechanical linkage is provided between the side brush carriage and top brush carriage, whereby, as the side brush carriage transits about the vehicle, it moves the top brush carriage to the rear of the vehicle and rearwardly of the rearwardmost side brush frame until the side brush is transited about the back of the vehicle whereup it re-engages the top brush carriage and moves it forwardly to the front of the vehicle whereupon it is moved forwardly of the forwardmost side brush frame to allow transit of the side brush. This operation may continue cyclically as desired.

A water supply system is associated with both the top brush and side brush carriages to supply water, with any additives desired, in the area of operation of the brushes. A waxing system may be disposed on the brush carriages to spray wax upon the washed vehicle, if desired.

A separate coin activating system is preferably associated with the mechanism on a pivotable arm, to allow the vehicle driver to place a coin in the coinbox to activate the machine and yet allow the coinbox to be moved from out of interference with the vertical brush by its transit thereby.

A high pressure washing system is disposed preferably near the exit of the washing structure to separately wash the vehicle wheels as the vehicle leaves the washing structure after the principal washing operation.

A blower may be added to the structure to aid in physically removing water from a washed vehicle and in drying the surface thereof thereafter. Preferably also a soft water device is included in the water supply system to avoid undue spotting of the vehicle after its washing.

In providing such a structure it is:

A principal object of my invention to provide a car washer of the type requiring no motion of the vehicle for the washing operation that has a simple, durable mechanical linkage between horizontal and vertical brushes of such reliability that it may be operated automatically without presence of an operator.

A still further object of my invention to provide such a car washing device of the nature aforesaid that is adaptable to be associated with the known auxiliary devices of the car washing fields, such as soapers, waxers, blowers and the like.

A still further object of my invention to provide such a device that is of new and novel design, of sturdy and durable nature, of simple and economic manufacture and one that is otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangement with only preferred and practical embodiment being illustrated in the accompanying drawings, as required.

BRIEF DESCRIPTION OF DRAWINGS

In the accompanying drawings wherein like numbers of refernce refer to similar parts throughout:

FIG. 2 is a plan view of the invention of FIG. 1 with the top of the structure of FIG. 1 removed.

FIG. 3 is a side cross-sectional elevation of the vertical brush carriage and vertical brush of my invention, showing the method of mounting and operation.

FIG. 4 is an isometric diagram of the coinbox of my invention showing particularly its method of pivotable mounting and biasing.

FIG. 5 is an orthographic side view of the side brush carriage driving means.

FIG. 6 is a top view of the same mechanical linkage shown in FIG. 5.

FIG. 7 is an isometric diagram of a stepping or counting switch used to determine the number of transists of my carriage about its course.

FIG. 8 is an isometric view of a typical feeler switch of my invention aiding in its electro-mechanical operation.

FIG. 9 is an isometric view of the mechanical linkage between upper and side brush carriages.

DESCRIPTION OF THE PREFERRED EMBODIMENT

Figure 1:
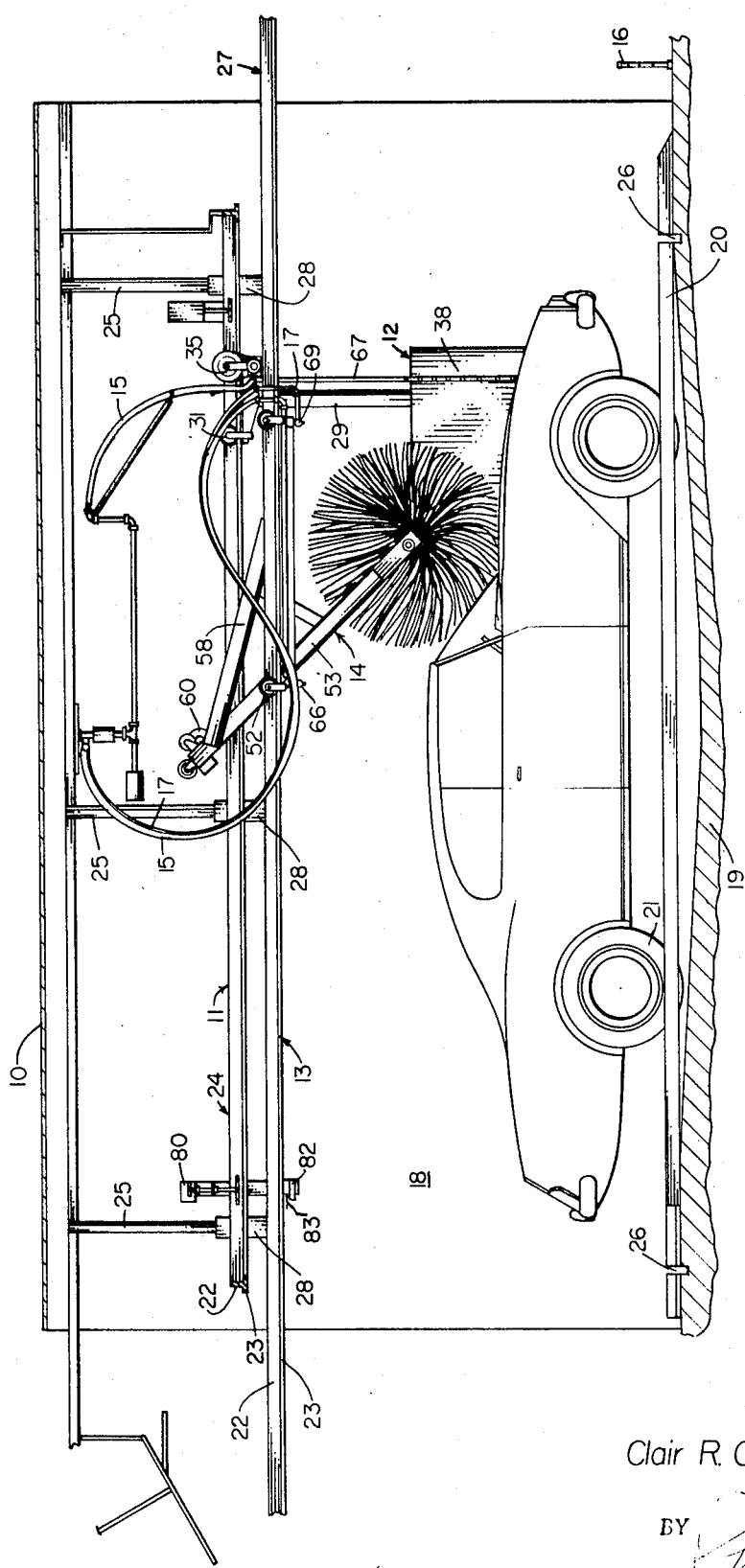
FIG. 1 is a cut-away side elevation of my invention showing a vehicle in washing position therein to illustrate configuration, relationship and operation of its parts.

Referring now to the drawings in more detail and particularly to those of FIGS. 1 and 2, it will there be seen that my invention comprises generally a peripheral sheltering structure 10 mounting vertical brush tracks 11 for transit of vertical brush carriage 12 and top bush tracks 13 for transit of top brush carriage 14; water system 15 associated with each brush; auxiliary wheel washing system 16; and waxing system 17.

The nature of the peripheral sheltering structure is not critical and it may be of any of the ordinary types that provide some shelter from the elements for the mechanical parts and allows ingress and egress of vehicles to the internal chamber 18, so long as it be sufficiently rigid to support the various mechanical elements of my invention. Concrete block structures with a beamed supported sheet metal roof admirably suit these purposes. Preferably the floor of the structure slopes to sump 19 to aid in collecting waste wash water for disposition; if this structure be used, I prefer to employ tracks 20 appropriately sized and spaced to raise the vehicle from support immediately upon the floor carrying the waste water and also provide a guidance means for autos. The sizes and shapes of most automotive vehicles are reasonably well standardized so that the design of the structure can be appropriately modulated to accept almost all vehicles. Although when a car is being washed, normally the operator will be inside to prevent its motion, it is advisable for added safety, to provide a slight indentation 21 in tracks 20 to aid in maintaining a vehicle in an appropriate position and in positioning it.

Vertical brush tracks 11 are formed from a continuous length of T-beam having vertical medial flange 22 and horizontal lower member 23 extending laterally on either side thereof. The track is formed with an elongate, somewhat rectangular shape, as illustrated in FIG. 2, with distinct substantially linear sides and ends and some curvature in the corner elements. The principal driving track 24 is suspended from the ceiling of the structure 10 to a position vertically above a car to be washed, by brackets 25 communicating therebetween. The secondary guiding track 26 of identical configuration is preferably positioned in and carried by the floor of the structure.

Top brush track members are of similar T-cross-sectional shape and comprise two elongate tracks positioned substantially parallel and slightly laterally and below of the side elements of the vertical brush tracks by brackets 28 communicating therebetween. Brackets 25 support both members on the enclosing structure. The length of top brush track 27 is somewhat greater in lineally extent (parallel to the direction of motion of a vehicle being washed), than that of the vertical brush member so that the top brush tracks extend forwardly and rearwardly of this member for appropriate motion of the top brush transiting thereon, as hereinafter more fully detailed.

The vertical brush assemblage is shown in gross in FIG. 1 and in somewhat more detail in FIGS. 3, 5 and 6. The elongate depending brush carriage post 29 carries upper support yoke 30 rotatably journaling guide wheels 31 for rolling linear motion upon upper vertical brush track 11. Driving power for the wheels is provided by motor 32 supported on yoke 30 by bracket 33 and communicating through driving mechanism 34 to driving cog 35 irrotatably mounted upon the shaft journaling one guide wheel 31 so that upon operation of motor 32, yoke 30 will be moved about the vertical brush track. The lowermost portion of post 29 carries lower guide wheels 36 adapted to rollably engage the upwardly projecting central flange of lower guiding track 26 to maintain the lower portion of the post in proper alignment.

Supported by pivotable motion on vertical brush carriage post 29 by appropriate bearings is vertical brush housing shaft 37. This shaft supports vertical brush carriage 38, having radially outwardly extending upper and lower brush arms 39, 40 journaling brush shaft 41 therebetween to mount brush 42 for rotation about this vertical axis. Brush motor 43 is carried within the brush carriage housing; it communicates externally thereof by the chain 44 to driving cog 45 irrotatably carried by the upward extension of the brush shaft of the upper brush arm to provide force for rotation of the vertical carriage. Vertical brush carriage housing is mechanically biased by linkage 46 extending between brush carriage post 29 and carriage housing 38 to maintain the brush arms in their innermost position. Rotation of the brush also is such that the gyratory force created by the brush tends to urge the brush toward the vehicle being washed.

Upper brush carriage 14 is formed with peripheral frame 50 carrying upwardly projecting brackets 51 in each of its corners rotatably journaling guide wheels 52 adapted to rollably mount the carriage for linear motion upon the upper carriage tracks. Paired opposed upper brush arms 53 are pivotably mounted in the rearward part of this frame with cross element 54 extending therebetween to provide requisite strength and communication. Top brush 55 is rotatably journaled on its axle 56 in the opposed bearings 57 carried by the outwardly extending portion of these arms. A gravity type counter-weight is provided by hollow pipe 58 carried in an angled position relative brush arms 53 by cross-element 54 and in turn carrying weighted ball 59, all so configured and related that the weight will bias the brush to a downward position but at the same time pipe 58 will be very nearly horizontal so that it might be manually raised, and if raised, in this position the ball will return to the other end of the pipe and bias the brush to an upward position. Top brush motor 60 is mounted upon the carriage by brackets 61 and communicates by chain 62 to driving cog 63 irrotatably carried upon the brush shaft to provide rotary power for the brush.

The linkage communicating between upper and side brush carriages is shown in FIG. 9. Offset brackets are provided in each of the forward lateral surfaces of the upper brush carriage with inwardly projecting catching flanges 64 providing a pocket therebehind, opening inwardly. A downwardly projecting catching dog 65 is carried by the upper part of vertical carriage post 29 and so positioned and configured as to be adapted to catch within the pocket behind fastening flange 64. Left catching flange 64a is somewhat forward of right flange 64b so that as the catching dog transits past flange 64a from the rear, flange 64b will be in position on the other side of the vertical brush track to contact the catching dog from the front; this positioning necessarily causes the same action during the rearward transit of the catching dog to cause a reciprocating motion of the upper brush carriage. The curvature of the corners of the vertical brush track is limited to the length of the inward extension of fastening flange 64 so that my invention might accomplish its proper function.

With this structure, as the vertical brush carriage moves from left to right across the front of a vehicle, at its lateralmost extension to the right it becomes engaged against the right portion of the frame element 50, whereupon the motion of the vertical post will move the top brush carriage rearwardly in its rearwardmost extension; the brush will then transmit laterally across the rear of the vehicle to the left side and there engage the left fastening flange 64 and bring the top carriage forward in the forward course of the vertical brush to thusly cause a reciprocating motion of the top brush as the vertical brush transits about the periphery of a vehicle.

A water supply system provides pressurized water to be distributed by elongate horizontal spray head 66 carried by the forward portion of the top brush carriage and vertically disposed elongate spray head 67 positioned on the vertical brush carriage immediately forward of the vertical brush. Any of the various additives well known in the car washing arts may be dispersed through the water system as is desired. Preferably the water supplied through the system is previously softened or otherwise treated to remove excessive mineral content so that there will not be spotting therefrom on the washed vehicle upon the drying of beads of liquid thereon.

The wheel washing system 16, preferably, if no drying system be used, is positioned forwardly of the housing exit and if a drying system be used, at the entrance of the structure—though in this position the wheel washers are not so effective as the dirt on the tire will not previously have been predisposed to removal. For spray heads of the wheel washer 16 to be effective it is necessary that the water dispersed therethrough be of quite high pressure and if the ordinary water system is not sufficient to maintain this pressure, it may be necessary to use an auxiliary pressure pump.

A wax spray head 69 may be disposed substantially parallel to the upper brush water supply head to cooperate with an auxiliary wax system to coat the washed vehicle with wax or similar coating after washing if desired.

A drying system (not shown) such as heretofore known in the art might be incorporated with the device if desired, to dry the vehicle after completion of the washing operation.

A coin activation system well adapted for use with my invention is shown in FIG. 4. Here bracket 70 is mounted on the left (driver's side) wall of sheltering structure 10 in a position immediately opposite the driver when the vehicle be in operative position. The ordinary coin acceptance type switch box 71 is positioned outwardly of bracket 70 by carrying arm 72 pivotably communicating with the bracket by pin 73. Tripping arm 74, extending outwardly past the coin box, is carried by tripping arm bracket 75. Biasing cable 76, operating through pulley system 77, is biased by weight 78 to maintain the coin box in an outwardly extending position, but manually moveable to an inward position to allow transit of the vertical washing brush thereby. A stop 79 prevents the rotation of the coin box past its outwardlymost extended position. With this structure then the coin box, upon transit of the side brush, will be moved out of the way during such transit, but at other times be returned to its biased operating position.

A mechanical stepping switch 80 with activating wheel 81 is positioned on the vertical brush frame so that the catching post 65 activates wheel 81 each time it passes thereby to electromechanically determine the number of transits of the vertical brush. This type of switch is well known in the art.

A feeler type switch 82 having the extending activating element 83, is positioned on the vertical brush carriage to start and stop flow of waters through an appropriate solenoid valve in the top brush water system when the top brush be inactive, during transit of the vertical brush across the front or back of a vehicle.

The electrical switching circuitry by which the functions of the mechanism are accomplished, is well known to persons skilled in the art, not new and not a direct part of my invention. Diagrams of it are not therefore set forth herein to encumber this application.

Having thusly described by invention, its operation may now be understood.

Firstly, a structure is formed according to the foregoing specifications. To operate it, a driver moves his vehicle into the appropriate position illustrated in FIG. 1, wherein he will be immediately opposite coin box 71. He inserts a coin in the box and thereupon the coin mechanism activates a switch to activate the electro-mechanical circuitry operating the mechanism. After a delay of ten seconds the top brush and the vertical brush, which then is in a position at the forward left corner of the device, activates rotation; guide wheel motor 32 commences rotation and begins driving the vertical brush carriage about the vertical brush track; and solenoid valves activate to allow flow of water through the water system and present it with the desired additives to the surface of the vehicle to be operated upon.

The vertical brush transits toward the right, across the front of the vehicle, and at its right lateral position comes into catching communication with the right portion of top brush frame 50. As the vertical brush carriage continues about its course, it moves rearwardly along the right side of the tract and moves the top brush carriage with it until it comes to its right rearwardmost position, (with the top brush carriage in its most rearward position) rearwardly of the vehicle and the rearwardmost extension of the vertical brush frame. The vertical brush then commences its lateral course to the left side of the vehicle moving leftward laterally across the forward portion of the top brush carriage frame, until its left lateralmost position it comes into catching communication with left fastening flange 64. Then as the vertical brush carriage continues forwardly along the left side of the vehicle, the catching post is fastened within the left fastening flange and the top brush carriage is pulled forwardly over the vehicle until the vertical brush assemblage is in its left forwardmost position from whence it may recyle according to the foregoing description. The number of cyclic courses about the vehicle may be regulated by stepping switch 80, which upon activation will turn off the brush motors, the guide wheel motor and the water.

Preferably sensor switches 82 are positioned at both forward and rearward courses of upper brush travel to stop flow of water in the upper brush circuitry when the brush is not washing, so as not to waste water.

Upon completion of the washing, as the vehicle moves from the enclosing structure, the wheel washers activate, preferably in response to action of a position sensitive switch, to cause a pressurized stream of water to spray upon the wheels of the vehicle as it leaves to further wash them. It should be noted in this regard that most of the dirt on the wheels will have had some washing action and will at this time be more susceptible to such a spray type wash.

It is to be noted that as the vertical brush transits past the coin box, it will be moved forwardly out of position so that it will not be damaged by the washing apparatus.

It is further to be noted that the vertical brush housing will be mainained in a normally inwardly biased position so that it will keep the vertical brush in contact with the vehicle. The rotation of the brush is also preferably established to cause a gyratory force to aid in this function.

Preferably the washing brushes are of the nonrigid plastic variety, common in the auto washing arts, that tend to extend their bristles only upon sufficient centrifugal force caused by rotation of the brush.

Auxiliary structures to accomplish other desired functions, such as a waxing system or a drying system, as heretofore commonly known in the auto washing art, may be added to my device.

The foregoing description of my invention is necessarily of a detailed nature so that a specific embodiment of it might be set forth, as required, but it is to be understood that various modifications of detail, rearrangement and multiplication of parts may be resorted to without departing from the spirit, essence or scope of my invention.

Having thusly described by invention, what I desire to protect by Letters Patent, and

What I claim is:

1. In a vehicle washing mechanism of the nature aforesaid having an elongate, substantially rectangular, vertical brush track positioned above a car to be washed, the track having a configuration substantially as large as the periphery of the vehicle to be washed; paired opposed top brush tracks somewhat longer than upper vertical brush track at a spaced distance below and laterally of the vertical brush track; a vertical brush carriage depending from and moveable about the vertical brush track; and a top brush carriage supported by the top brush tracks for reciprocal motion therealong, the invention comprising:
   mechanical linkage communicating between the brush carriages including a forward peripheral cross-member on the top brush carriage mounting opposed brackets on each end, each bracket mounting inwardly extending catching flanges slightly offset in the direction of travel of the vertical brush carriage, and the upper portion of the vertical brush carriage carrying a downwardly projecting catching dog adapted to contact the inwardly extending catching flanges alternately during its course of travel about the vertical brush track to cause the vertical brush carriage to reciprocally move the top brush carriage on each forward and rearward motion.

2. In a vehicle washing mechanism of the nature aforesaid, the combination comprising:
   an elongate substantially rectangular vertical brush track positioned above and about a vehicle to be washed;
   paired opposed top brush tracks disposed parallel to the larger dimension of and at a spaced distance below and laterally of the vertical brush track;
   a vertical brush carriage depending from and moveable about the vertical brush track;
   a top brush carriage supported for motion on the top brush tracks;
   mechanical linkage communicating between the brush carriages including a forwardmost peripheral member on the top brush carriage mounting brackets on each end, each bracket mounting inwardly extending catching flanges slightly offset in the direction of travel of the vertical brush carriage, and the upper portion of the vertical brush carriage carrying a catching dog to contact the catching flanges alternately during motion of the vertical brush carriage about its track so that motion of the vertical brush carriage forwardly and rearwardly causes corresponding motion of the top brush carriage; and
   means for moving the vertical brush carriage about the vertical brush track.

3. The invention of claim 2 carried about a working chamber defined by peripheral structural surfaces with tracks on the floor thereof having indentations to aid in properly positioning a vehicle relative the washing structure.

4. The invention of claim 2 wherein the vertical brush carriage is further characterized by a housing pivotably disposed thereon with outwardly extending brush arms biased to position a brush vertically journaled between the brush arms to rotate against a vehicle to be washed; and means of rotating the vertical brush.

5. The invention of claim 2 wherein the top brush carriage is further characterized by spaced pivotably mounted brush arms rotatably journaling a top brush therebetween, the brush arms being biased to maintain the top brush upon the top surface of a vehicle therebelow; and means of rotating the top brush.

References Cited

UNITED STATES PATENTS 3,208,088   9/1965   Sulzberger et al.   15—21(C.O.)

FOREIGN PATENTS 664,430   5/1965   Belgium   15—CCP

EDWARD L. ROBERTS, Primary Examiner